US009953238B2

(12) United States Patent
Abhau

(10) Patent No.: US 9,953,238 B2
(45) Date of Patent: Apr. 24, 2018

(54) IMAGE PROCESSING METHOD AND SYSTEM FOR EXTRACTING DISTORTED CIRCULAR IMAGE ELEMENTS

(71) Applicant: MANDO CORPORATION, Gyeonggi-do (KR)

(72) Inventor: Jochen Abhau, Frankfurt am Main (DE)

(73) Assignee: MANDO CORPORATION, Gyeonggi-Do (KR)

(*) Notice: Subject to any disclaimer, the term of this patent is extended or adjusted under 35 U.S.C. 154(b) by 98 days.

(21) Appl. No.: 15/081,779

(22) Filed: Mar. 25, 2016

(65) Prior Publication Data
US 2016/0283821 A1   Sep. 29, 2016

(30) Foreign Application Priority Data
Mar. 26, 2015   (DE) .................. 10 2015 205 502

(51) Int. Cl.
G06K 9/00   (2006.01)
G06K 9/52   (2006.01)
(Continued)

(52) U.S. Cl.
CPC .......... *G06K 9/52* (2013.01); *G06K 9/00818* (2013.01); *G06K 9/4652* (2013.01); *G06T 7/11* (2017.01);
(Continued)

(58) Field of Classification Search
CPC .... G06K 9/52; G06K 9/4652; G06K 9/00818; G06K 9/6267; G06K 9/4661;
(Continued)

(56) References Cited

U.S. PATENT DOCUMENTS 5,189,711 A    2/1993  Weiss et al.
2010/0067805 A1*  3/2010  Klefenz ............... G06K 9/4633
                                                         382/201
(Continued)

FOREIGN PATENT DOCUMENTS

JP   2005-284377   10/2005
JP   2006-259885    9/2006
(Continued)

OTHER PUBLICATIONS

Office Action dated Jan. 9, 2017 for Korean Patent Application No. 10-2016-0036888 and its English summary, and machine translation by Google Translate.
(Continued)

*Primary Examiner* — Yon Couso
(74) *Attorney, Agent, or Firm* — Ladas & Parry, LLP

(57) ABSTRACT

The invention relates to an image processing method for automatically extracting distorted circular image elements (109; 601) from an image (101), comprising the steps of determining, by means of a circle detection (102), at least one circular image section (103; 301, 301') as a first approximation of at least one distorted circular image element (109; 601), then determining, via a statistical color analysis of the at least one determined circular image section (301, 301'), whether the circular image section (301, 301') belongs to one of one or more predefined color classes and, in case thereof, assigning the circular image section to the respective color class, and, finally, determining an exact shape (109; 601) of the at least one distorted circular element by starting with at least one of the one or more determined circular image sections assigned to one of the one or more color classes and varying the image section to maximize a value of a color-class specific function of the image section. The invention furthermore relates to an image processing system which is configured for performing the steps according to the image
(Continued)

Figure 1:
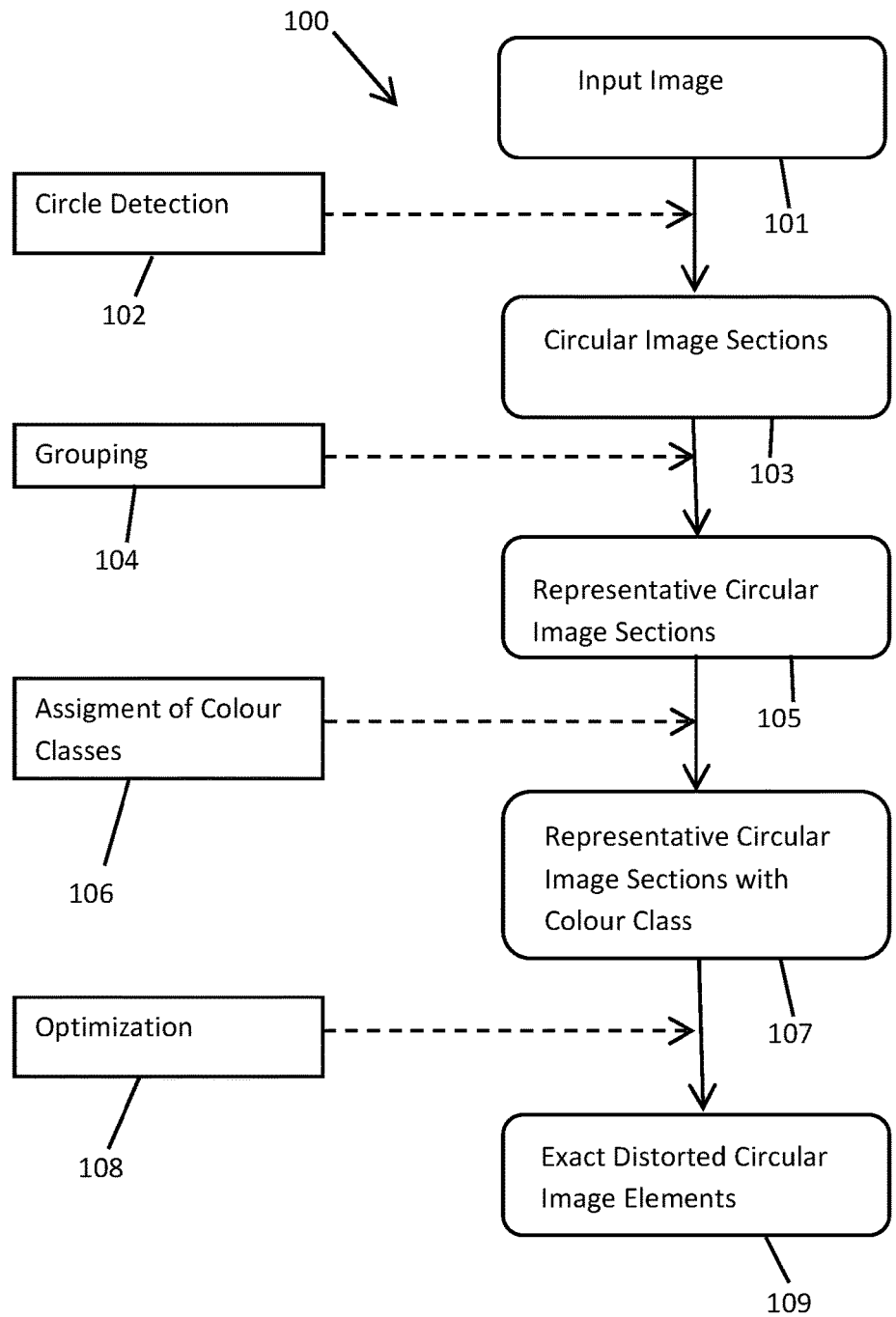

processing method described above, and to a use of the image processing method or of the image processing system for determining ground truth values of a given input data set of images.

16 Claims, 4 Drawing Sheets

(51) Int. Cl.
*G06K 9/46* (2006.01)
*G06T 7/11* (2017.01)

(52) U.S. Cl.
CPC ............ *G06T 2207/10024* (2013.01); *G06T 2207/20061* (2013.01); *G06T 2207/20076* (2013.01); *G06T 2207/30252* (2013.01)

(58) Field of Classification Search
CPC . G06T 2207/10024; G06T 2207/20061; G06T 2207/20076; G06T 7/11; G06T 2207/30252; G06T 7/60; G06T 7/408
See application file for complete search history.

(56) References Cited

U.S. PATENT DOCUMENTS

| | | | | |
|---|---|---|---|---|
| 2010/0310129 | A1* | 12/2010 | Hopfner; Sebastian | G06K 9/44 382/104 |
| 2010/0329513 | A1* | 12/2010 | Klefenz | G01C 21/00 382/104 |
| 2014/0153834 | A1* | 6/2014 | Poyil | G06K 9/00818 382/199 |
| 2015/0278615 | A1* | 10/2015 | Ogawa | G06K 9/00818 348/148 |

FOREIGN PATENT DOCUMENTS

| | | |
|---|---|---|
| JP | 2009-163714 | 7/2009 |
| JP | 2013-69278 | 4/2013 |
| KR | 10-2007-0027758 | 3/2007 |
| WO | 2013/052812 | 4/2013 |

OTHER PUBLICATIONS

Notice of Allowance dated Jul. 19, 2017 for Korean Patent Application No. 10-2016-0036888 and its English machine translation by Global Dossier.

* cited by examiner 302   303   304

IMAGE PROCESSING METHOD AND SYSTEM FOR EXTRACTING DISTORTED CIRCULAR IMAGE ELEMENTS

CROSS-REFERENCE TO RELATED APPLICATION

This application claims the priority to German Patent Application No. 102015205502.7, filed on Mar. 26, 2015, the disclosure of which is incorporated herein by reference in its entirety.

The present invention relates to an image processing method and system for automatically extracting distorted circular image elements from an image.

Visual assistance systems, such as driver assistance systems or systems used for camera assisted surgery rely heavily on automatic recognition and extraction of image sections of a given shape and/or colour. Among the possible shapes to be extracted from an image, circular image sections are relatively easy to find. They can be found by using the well-known Hough transform with a 3-dimensional voting space, or even faster by using a fast radial symmetry transform prior to utilizing a Hough-like voting procedure.

However in images, objects that are circular in real-life are often viewed from an angle and appear distorted. Also, circular image elements might be partially obscured in an image. While the human eye is very capable of finding these distorted round elements, a computer program needs to use a higher-dimensional parameter space in order to detect and determine distorted round image sections. In order to find elliptical image elements—one variant of distorted circular image elements—via a generalized Hough transform, a 5-dimensional parameter space needs to be used, making this approach unfeasible for large or high-resolution images.

U.S. Pat. No. 5,189,711 discloses a method for determining elliptical image elements by finding two edges of the elliptical shape by a coarse grained scan of the image and by then using the property, that the midpoints of the edges of an elliptical shape lie on a straight line.

WO 2013/052812 A1 generalizes the fast radial symmetry transform algorithm to determining elliptical shapes via a 3-dimensional voting vector.

While the state of the art allows for fast or accurate detection of elliptical images, each method comes with a price. Either the methods are too computationally expensive and, therefore, slow for on-the-fly application or the accuracy suffers.

Statistical learning methods are increasingly popular for image analysis, as they are trained and optimized on a set of training data only once, or periodically offline, and can provide very fast prediction results, usually in linear or even sub-linear time with respect to the size of the input.

In order to train a statistical learning method, such as a support vector machine, a Bayesian network, a neural network or a kernel ridge regression algorithm, the training set needs to be very accurate, as inaccuracies in the training set are often magnified in the accuracy of the predictions.

So far, the gold standard for evaluating image analysis systems has been human vision. However, classifying or sectioning thousands of images by hand is a tedious and time-consuming task.

It is, therefore, an object of the invention to provide a method and a system that automatically finds distorted circular image elements with a high precision and low computational cost.

This is achieved by an image processing method and system according to the independent claims, which automatically extracts distorted circular image elements from a given image. Preferable aspects are defined in the dependent claims.

In a first step of the method according to the invention, potential candidates for distorted circular image elements are determined via circle detection. This results in circular image sections, as a first and/or rough approximation of one or more distorted circular image elements. For the circle detection, it is possible to use a Hough circle detection, which find circles through a Hough transform in a 3-dimensional voting space, or to use other edge or circle detection schemes, such as, for example, a fast radial symmetry transform or a Sobel operator.

In another step of the inventive method, statistical colour analysis is used to determine whether the circular image section belongs to one of one or more predefined colour classes. To this end, a number of colour, which serve as a first classification and/or filtering of the circular image sections determined by the circle detection, may be defined beforehand depending on the kinds of distorted circular image sections to be detected and/or extracted. The characteristic properties of the respective colour class may, for example, be defined on the basis of colour channels, distribution of the pixels of certain colour values, greyscale values, brightness values and/or other colour-related image properties. Colour-channel dependent colour classes may, for example, be defined by dividing the average one colour channel of an image section by the sum of the other colour channels of the image section.

If the image section belongs to a colour class, it is assigned to its respective colour class for further processing. Depending on the application, it is also possible to assign circular image sections to multiple colour classes, or to define a "remainder" colour class, to which all circular image sections which do not belong to any other colour class get assigned.

It is hereby preferable to define the application dependent colour classes in such a way that membership can be determined in a fast and accurate manner, without making the individual colour classes too broad.

After the image sections have been assigned to their respective colour classes, the exact shape of the distorted circular image section is determined, starting with at least one of the one or more determined circular image sections assigned to one of the one or more colour classes, by varying the image section in order to maximize the output value of a given, colour-class specific function of the image section. This way it is possible to extract distorted circular image sections with high precision. The colour class specific function which is actually evaluated may, of course, also be defined in a way such that it is to be minimized instead of being maximized to find the exact shape of the distorted circular image section. This is to be understood as comprised by the term "maximizing a function" in the sense of the present application.

Afterwards, further processing of the determined and/or extracted distorted circular image elements may be necessary in order to obtain a final output value, which might be represented, for example by a numeric value, a vector or a, in case of classification, one of one or more predefined classes.

According to the present invention, a corresponding image processing system for automatically extracting distorted circular image elements includes an evaluation unit, which may contain a processor or microprocessor or other computation unit. Furthermore, a camera may be attached to the evaluation unit to determine and/or extract distorted circular image elements on-the-fly. The evaluation unit is configured for analysing an image by performing, corresponding to the method described above, the following steps:

determining, by means of a circle detection, at least one circular image section of the image as a first approximation of the at least one distorted circular image element, determining, via a statistical colour analysis of the at least one determined circular image section, whether the circular image section belongs to one of one or more predefined colour classes and, if so, assigning the circular image section to the respective colour class, and determining an exact shape of the at least one distorted circular image element by starting with at least one of the one or more determined circular image sections which are assigned to one of the one or more colour classes and by varying the image section to maximize a value of a colour-class specific function of the image section.

The resulting precisely extracted distorted circular image elements can in particular be used for training and/or analysing other image processing and/or statistical learning methods. Depending upon the available computational power, the size of the input images and/or given time constraints, the inventive method and system can also be used for precise detection and extraction of distorted circular image elements on-the-fly.

The colour-class specific function to be maximized may be defined to assign a colour average dependent value to each image section. Varying the distorted circular image section to maximize a function based on a colour average dependent value serves the purpose of precisely extracting image elements which have a colour different from their background. It is hereby also possible to treat different parts of the image section individually, for example different colour channels could be taken into account in the centre of the image section, on an outer ring of the image section, at the top, bottom, left or right of the images section. In these cases, additional parameters may be used to specify the different respective parts of an image section.

The colour average dependent value may, for example, be calculated as a weighted sum of brightness gradients of an outline of the respective image section and/or of pixel values of at least one colour channel over at least a part of the respective image section.

Hereby the brightness gradients of the outline of the image section serve to determine the edge of an image element with higher precision. When an image is converted to a grey scale, outlines of image elements remain visible to the human eye due to their difference in brightness alone. This difference can be detected automatically by comparing neighbouring pixels, or neighbouring groups of pixels.

The pixel values of one or more colour channels, which may be used in addition or instead, make the function colour-class specific and capture image information that is not well preserved when converting an image to a grey scale. Depending on the application and on the nature of the image elements to be detected, the image elements may have characteristic average values for different colour channels. By taking different colour channels into account depending on the part of the image section, or by restricting the weighted sum to a part of the image section, for example to a ring of a certain width, it becomes possible to exclude certain undesirable image parts from the calculation. This may, for example, be advantageous if part of the image element to be detected is overlapped by another, unwanted image element, or if different parts of the image element contain different colours.

The distorted circular image elements to be detected may, for example, be distorted round traffic signs, i.e. round traffic signs which appear distorted due to being viewed from an angle. Hereby the extend of the distortion might also be taken into account, as traffic signs belonging to a side street and which therefore appear highly distorted could be excluded from detection and extraction. In the case of round traffic sign extraction, the colour classes can be defined based on the distinct colour schemes of different kinds of round traffic signs.

For additional efficiency of the inventive method or system, an additional processing step may be added to the inventive method or to the configuration of the evaluation unit of the corresponding image processing system by grouping the circular image sections according to their radiuses and/or centre points prior to determining the exact shape of the at least one distorted circular image element. The grouping may happen heuristically according to given parameters and does not have to be exact. The grouping allows for assigning circular image sections which likely belong to the same distorted circular image element to the same group. It is then possible to select one representative circular image section or a proper subset of representative circular image sections from each group, and to restrict the determining of the exact distorted circular image elements to the representative circular image sections.

Typically, the grouping step is done right after determining the image sections by means of the circle detection, so that the step of statistical colour analysis and assigning the circular image sections to colour classes may be restricted to the selected representatives.

Adding this additional step may save processing time, as only some (the representative) circular image sections are used during the maximizing, or optimizing step. In another variation, the grouping may also be used to add more precision to the inventive method or system by performing the optimization step of all circular image sections and then comparing, and possibly further optimizing, the optimization results of the image section belonging to one group.

The grouping may happen according to fixed values, for example by defining a static maximal distance between the centre points. The static maximal distance may be absolute or relative, for example depending on the size of the image, the number, radiuses and/or locations of the detected circles.

According to another aspect, the grouping may happen according to a dynamic similarity measure, such as clustering or k-nearest-neighbour-analysis, which takes all determined circular image sections into account.

It is furthermore possible to vary the image section iteratively in order to obtain the exact shape of the at least one distorted circular image element. This is advantageous as well-known iteration algorithms can be employed. Also stopping conditions can be easily defined for iterative algorithms, thus defining a trade-off between time and preciseness of the determined distorted circular image element.

Furthermore, the varying of the image sections may be restricted to elliptical shapes as the distorted circular image elements to be detected and/or extracted will typically be of elliptical shape. This has the advantage that an ellipse can be precisely specified in a 5-dimensional parameter space. When determining exact elliptical shapes through an iterative maximization of the value of a given function, it is possible to adjust the parameters of the elliptical shape individually, as opposed to a computationally expensive brute-force approach which optimizes all parameters simultaneously.

The image processing method and the image processing system described here may, in particular, be used to determine ground truth values of a given input data set of images. The input data set and the respective determined values can then be used for training, testing, calibrating, analysing and/or improving another image processing method or system, for example a driver assistance system used for detecting and analysing traffic signs. Fast versions of the method may also directly be used in a driver assistance system for determining round traffic signs.

A precise ground truth data set is especially important in the case of statistical learning methods for fast prediction. These methods usually come with a higher error rate, but they can extract, determine and/or predict values of previously unseen input data (in this case, images) in real-time.

Figure 2:
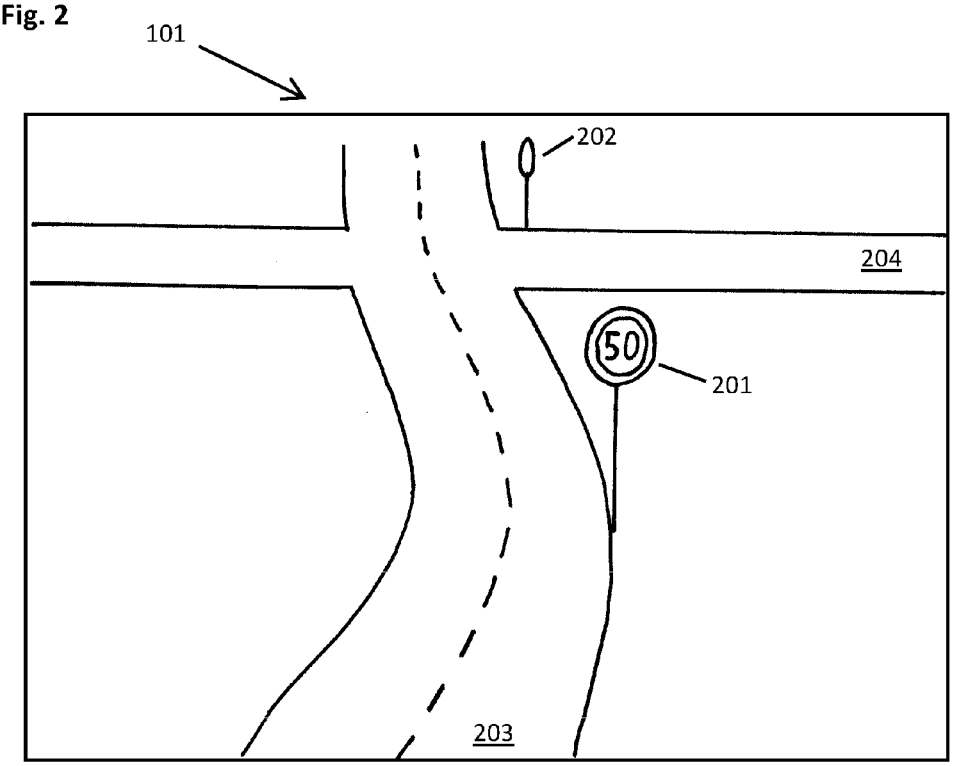
Figure 3:
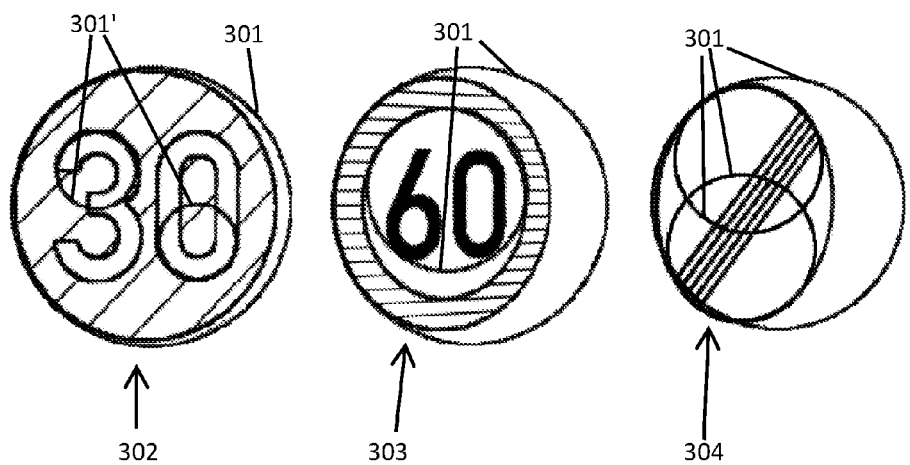
Figure 4:
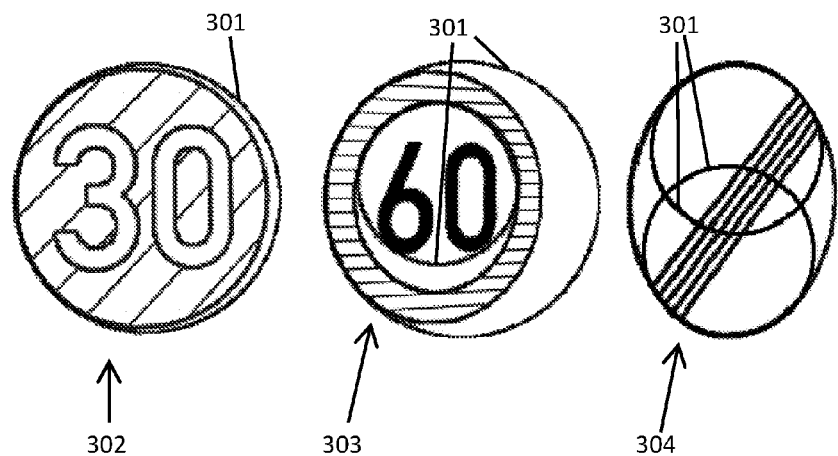
Figure 5:
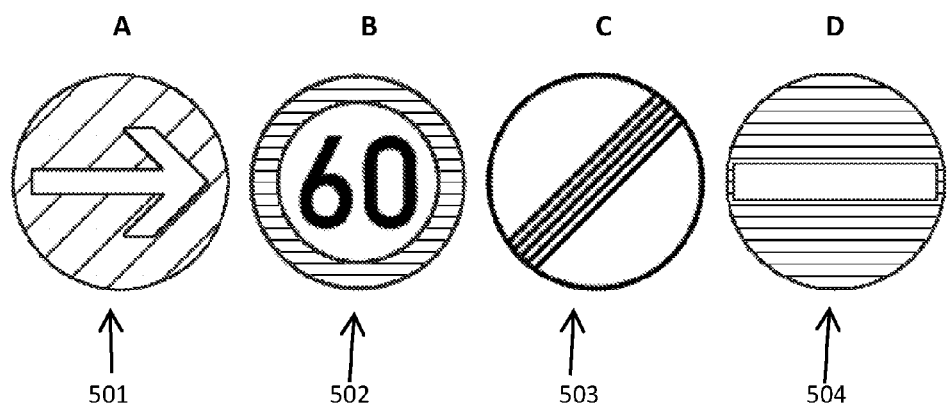
Figure 6:
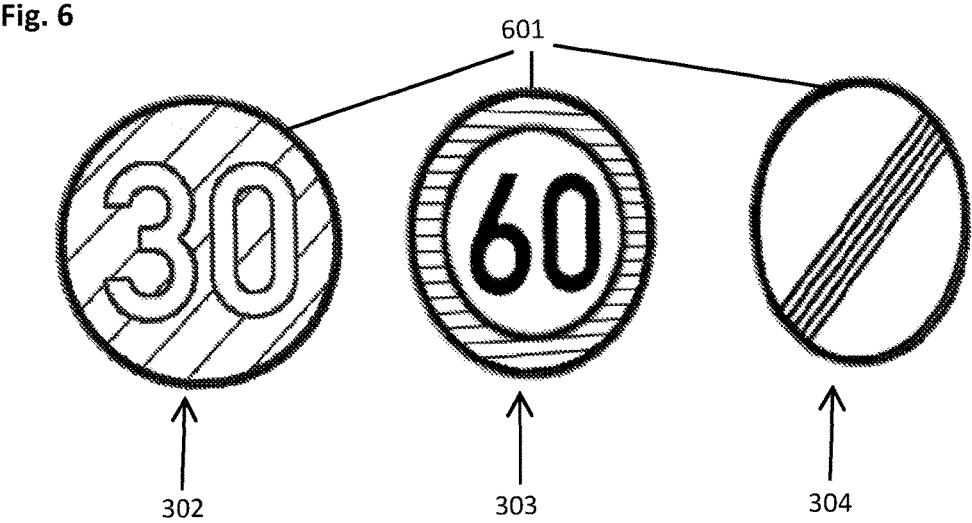
Figure 7:
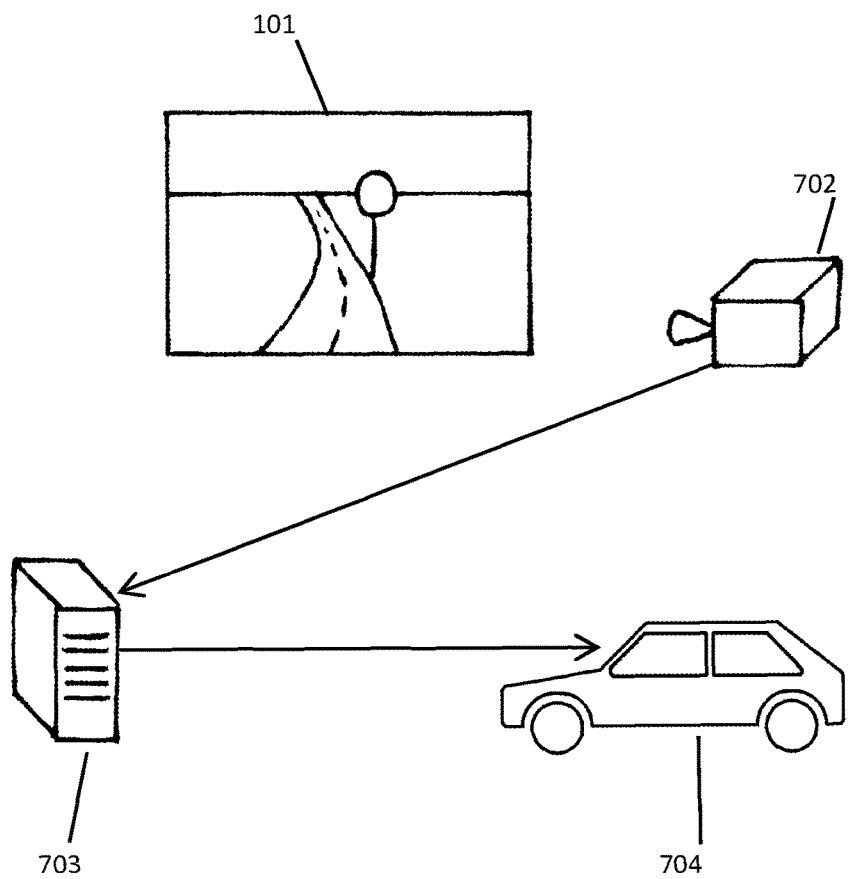

Exemplary embodiments of the invention are described below referring to the figures, where FIG. 1 shows a control flow chart illustrating different steps of an image processing method, FIG. 2 shows an image to be analysed, showing an intersection with distorted circular traffic signs, FIG. 3 shows different distorted circular traffic signs and examples of detected circles, FIG. 4 illustrates a grouping of the detected circles, FIG. 5 shows representative traffic signs belonging to different colour classes, FIG. 6 shows exact outlines of distorted circular traffic signs of FIGS. 3 and 4, the exact outlines being determined by the image processing method of FIG. 1, FIG. 7 illustrates the different components of the image processing system.

In FIG. 1, a control flow 100 of an image processing method for extracting distorted round image elements 109 from a given input image 101 is depicted. This method, as depicted by the control flow 100, can be applied to automatically detect round traffic signs in images.

Such an image 101 is shown in FIG. 2, which depicts an intersection, with distorted round traffic signs 201, 202, which appear as having an elliptical shape due to an inclined viewing angle. Thus, they may be detected by the image processing method described here as distorted circular image elements.

In a first step, a circle detection 102, for example a Hough circle detection, is used to detect circular image sections 103. The circular image sections serve as a first, rough approximation of the distorted round image elements 109.

Hereby parameters of the circle detection 102 may be chosen in such a way that the slightly distorted round traffic sign 201 is detected while the highly distorted round traffic sign 202, which is positioned on a side road 204 and irrelevant for a car travelling on the road 203, is not detected.

FIG. 3 shows some distorted traffic signs 302, 303, 304 as they may appear in the input image 101 and some of the circular image sections 301, 301' detected in the input image 101 by the Hough circle detection algorithm. The circular image sections 301, 301' are found as the corresponding traffic signs 302, 303, 304 has a contour or edge that coincides—even though not exactly—to a large extend with a circle defining the respective circular image section 301, 301'.

It can be observed that circular image elements that are more distorted yield circles of more different radiuses and centre points by means of the circle detection. Furthermore, in FIG. 3, some of the detected circles 301' are irrelevant for the application of detection and extraction of distorted round traffic signs, as they do not correspond to distorted round traffic signs. In these cases, the undesirable circles can be filtered out through a colour-class assignment or by a grouping step as described below. It is also possible to add an application specific additional filtering step to detect circles that are properly contained inside another circle and to filter these out depending on their respective radiuses (keeping in mind that, in some cases, circles that are properly contained inside one another are actually part of a valid solution).

According to the control flow diagram of FIG. 1, the circular image sections 103 (herein after also referred to as "circles") detected by the circle detection 102 are then grouped in a grouping step 104 according to the detected circles' radiuses and centre points. Two parameters $dist_{SR}$ and $dist_{DR}$ control whether circles of the same radius or different radius, respectively, belong to the same group. Hereby same radius is usually defined as a range, for example radiuses that are similar but not identical, e.g. within a factor of 0.95 to 1.05 of each other, may be regarded as "same" by the algorithm to account for mild inaccuracies of the images and/or the circle detection.

Furthermore radiuses that are "different" according to the algorithm, may not necessarily include all possible differences, but may again be defined according to an application specific range.

According to one preferred embodiment, any new found circle belongs to a new group if there is no group yet which fulfils one of the following conditions:

I. Group has circles with the "same" radius as the radius of the new found circle and the average of the centre points of the circles with the "same" radius is within $dist_{SR}$ of the centre point of the new found circle.

II. Group has circles with a radius "different" from the radius of the new found circle and the average of the centre points of the circles with the "different" radius is within $dist_{DR}$ of the centre point of the new found circle.

Otherwise, the new found circle is added to the respective existing group. Typically, circles with the same radius may belong to two different portions of the same distorted circular image element, as can, for example, be observed in the rightmost traffic sign 304 in FIG. 3. Depending on the degree of distortion, the centre points of the circular image elements with the same radius may be close together (for example, when there is an overlap of the circular image sections 301) or further apart (with little or no overlap). In the case of round distorted traffic sign detection, it can be regarded as unlikely that circular image sections with the same radius belong to different distorted circular traffic signs.

Circles with different radiuses usually belong to the same distorted circular image element only when there is a substantial overlap. In the case of speed limit signs, for example, there are usually at least two circles properly contained inside one another, both of which are relevant for the further optimization procedure. On the contrary, there might be additional circular image sections 301' within another circular image section, which are not relevant for the further procedure, as can be seen in the distorted circular traffic sign 302 shown in FIG. 3.

In some embodiments, the grouping step and/or colour class assignment may be used to eliminate circular image elements which are irrelevant to the detection and extraction of those distorted circular image elements desirable to the specific application. The result of such a grouping step 104 carried out on the circular image sections of FIG. 3 can be observed in FIG. 4. There, some circular image sections 301, one selected out of each group, remain as representative circular image sections 301, 105, which may then be used for the further processing steps.

In a next step, a classification step 106, the representative circular image sections 105, 301 are analysed via a statistical colour analysis in order to assign the representative circular image sections 105, 301 to colour classes.

FIG. 5 shows examples of round traffic signs belonging to different colour classes. Here, four distinct classes are defined, namely A) blue backgrounded round traffic signs 501,
B) red bounded round traffic signs 502,
C) greyscale round traffic signs 503 and
D) red-filled round traffic signs 504.

This assignment to colour classes in the classification step 106 can be achieved via statistical colour analysis even if the corresponding circular image section 105, 301 does not very accurately define the distorted circular image element yet. As a result of the classification step 106, the representative circular image element 301 corresponding to the traffic sign 303, e.g., is assigned to class "A" while the two representative circles corresponding to the traffic sign 303 are assigned to class "B" and the representative circle corresponding to the traffic sign 304 is assigned to class "C".

It is also possible to first assign a colour class to each circular image section detected by the circle detection and then use the resulting class as another feature during the grouping step 104 of the circular image sections according to their radiuses and centre points.

The representative image sections with colour class information 107, which result from the grouping step 104 and classification step 106, are then used to optimize, in an optimization step 108, the image sections to determine an exact shape of the respective distorted circular image element 109. Hereby, class-suitable deformable models are defined, which may, in particular, be one or two elliptical shapes used for fitting the exact shape of the contour of the circular image elements 109 as traffic signs 302, 303, 304, respectively, starting from the classified representative circles. Each elliptical shape can be defined precisely by five parameters, i.e. centre point coordinates (x,y), width (w), height (h) and rotation angle ($\alpha$).

For each colour class there may be a colour-class specific function, which is to be maximized by varying the deformable model. In the case of the preferred embodiment regarding detection and extraction of distorted round traffic signs, a shape element S may be defined for each of the colour classes A, C and D, while two shape elements $S_1$ and $S_2$ may be defined for colour class B.

For each elliptical shape element, the value which is to be maximized can be defined according to two different parts of a function. In one part of the function, a brightness gradient added up over the outline of the one or more shape element, defined herein as gradient(O(S)), is taken into account, wherein the second part of the function takes colour-channel averages of the pixel values inside the shape element S into account, defined herein by avg(S,colourChannel). In the case of colour class B, a difference $S_1$-$S_2$ of the two defining shape elements $S_1$ (outer circle or ellipse) and $S_2$ (inner circle or ellipse) is used to specify the (in this case red) border of the respective round traffic sign.

The two parts of each function are weighted according to constants $\beta$ and $\gamma$ and the shape elements S or S1 and S2 are then, according to one exemplary embodiment, optimized by maximizing in each case one of the following functions A, B, C and D, the function being selected corresponding to the respective colour class A, B, C or D:

A) $\gamma_A \cdot \dfrac{avg\,(S,\,\text{blue})}{avg\,(S,\,\text{red}) + avg\,(S,\,\text{green})} + \beta_A \cdot \text{gradient}(O(S))$ B) $\gamma_B \cdot \dfrac{avg\,(S_1 - S_2,\,\text{red})}{avg\,(S_1 - S_2,\,\text{blue}) + avg\,(S_1 - S_2,\,\text{green})} +$
$\beta_B \cdot (\text{gradient}(O(S_1)) + \text{gradient}(O(S_2)))$ C) $\gamma_C \cdot (avg\,(S,\,\text{blue}) + avg\,(S,\,\text{red}) + avg\,(S,\,\text{green})) +$
$\beta_C \cdot (\text{gradient}(O(S)))$ D) $\gamma_D \cdot \dfrac{avg\,(S,\,\text{red})}{avg\,(S,\,\text{blue}) + avg\,(S,\,\text{green})} + \beta_D \cdot \text{gradient}(O(S))$ Normally, it will be sufficient to start the optimization step 108 with only the representative circular image section 105, 107, 301. Instead, it would be possible to start an optimization run for each circular image section 103, 301, 301' and to then select, for each group, the result with the best maximal value as the main result.

The maximization which is done in the optimization step 108 can happen iteratively by varying the parameters of the, preferably elliptically shaped, deformable model either together or individually.

As iterative algorithms tend to fall into local maxima, it may be preferable to start an optimization run with several representatives of one group, as mentioned above.

FIG. 6 shows the resulting distorted circular image elements 109, 601 found by the optimization step 108 starting from the circular image sections 103, 301, or their representatives shown in FIG. 3 and FIG. 4.

After the distorted circular image elements 109, 601 have been extracted with high precision, as explained above, further processing steps might be performed to analyse the content of the extracted image section for further classification or regression purposes.

The results of the extraction of distorted traffic signs from images, which may be obtained by a camera-equipped driver assistance system, can, in particular be used as ground truth values for training other faster but less precise image analyzing methods as they may be used in a driver assistance system to detect traffic signs in real-time.

FIG. 7 shows a setup of a system for automatically detecting distorted round traffic signs. Here, an image 101, in this case a photograph, which is recorded by a camera 702 is passed to an evaluation unit 703 which is configured for processing the image 101 according to the control flow depicted in FIG. 1. The result may then be used as a ground truth data for training, testing or calibrating a driver assistance system, which is located within a car 704.

The invention claimed is:

1. An image processing method for automatically extracting distorted circular image elements from an image, comprising the steps of
(a) determining, by means of a circle detection, at least one circular image section as a first approximation of at least one distorted circular image element,
(b) determining, via a statistical colour analysis of the at least one determined circular image section, whether the circular image section belongs to one of one or more predefined colour classes and, assigning the circular image section to the respective colour class, and
(c) determining an exact shape of the at least one distorted circular element by starting with at least one of the one or more determined circular image sections assigned to one of the one or more colour classes and varying the image section to maximize a value of a colour-class specific function of the image section.

2. The image processing method of claim 1, wherein the circle detection is a Hough circle detection.

3. The image processing method of claim 1, wherein the colour-class specific function assigns a colour average dependent value to each image section.

4. The image processing method according to claim 3, wherein the colour average dependent value is a weighted sum of brightness gradients of an outline of the each image section and/or of pixel values of at least one colour channel over at least a part of the each image section.

5. The image processing method according to claim 1, wherein the distorted circular image elements are distorted round traffic signs.

6. The image processing method according to claim 1, wherein, prior to step (c), the circular image sections determined by the circle detection are grouped according to their radiuses and centre points, only one representative or a proper subset of representatives per group is selected and the determining of the exact shape is restricted to the selected representatives.

7. The image processing method according to claim 1, wherein, in step (c), the at least one image section is varied iteratively.

8. The image processing method of claim 1, wherein the varying of the image section is restricted to elliptical shapes.

9. An image processing system for automatically extracting distorted circular image elements, including an evaluation unit, the evaluation unit being configured for analyzing an image, by performing the following steps:
  (a) determining, by means of a circle detection, at least one circular image section of the image, as a first approximation of at least one distorted circular image element,
  (b) determining, via a statistical colour analysis of the at least one determined circular image section whether the circular image section belongs to one of one or more predefined colour classes and, assigning the circular image section to the respective colour class, and
  (c) determining an exact shape of the at least one distorted circular element by starting with at least one of the one or more determined circular image sections assigned to one of the one or more colour classes and varying the image section to maximize a value of a colour-class specific function of the image section.

10. The image processing system according to claim 9, wherein the circle detection is a Hough circle detection.

11. The image processing system of claim 9, wherein the colour-class specific function assigns a colour average dependent value to each image section.

12. The image processing system of claim 11, wherein the colour average dependent value is a weighted sum of brightness gradients of an outline of the each image section and/or of pixel values of at least one colour channel over at least a part of the each image section.

13. The image processing system of claim 9, wherein the distorted circular image elements are distorted round traffic signs.

14. The image processing system of claim 9, wherein the circular image sections determined by the circle detection are grouped according to their radiuses and centre points, only one representative or a proper subset of representatives per group is selected and the determining of the exact shape is restricted to the selected representatives.

15. The image processing system of claim 9, wherein the at least one image section is varied iteratively.

16. The image processing system of claim 9, wherein the varying of the image section is restricted to elliptical shapes.

* * * * *